United States Patent
Okpokowuruk

[19]

[11] Patent Number: 6,053,288
[45] Date of Patent: *Apr. 25, 2000

[54] BRAKE MECHANISM FOR CONTROL OF VERTICAL MOTION OF A VERTICALLY ALIGNED ADJUSTABLE DRAIN TUBE

[75] Inventor: Paul E. Okpokowuruk, Charlotte, N.C.

[73] Assignee: Alemite Corporation, Charlotte, N.C.

[ * ] Notice: This patent is subject to a terminal disclaimer.

[21] Appl. No.: 09/338,830

[22] Filed: Jun. 23, 1999

Related U.S. Application Data

[62] Division of application No. 08/749,799, Nov. 15, 1996.

[51] Int. Cl.⁷ ..................................................... B65H 59/10
[52] U.S. Cl. ............................. 188/67; 248/410; 24/525; 403/110; 403/321
[58] Field of Search ..................... 24/525, 569; 285/902; 254/106; 248/161, 410, 411, 414; 188/67, 69; 403/109, 110, 321; 184/1.5; 141/98, 334

[56] References Cited

U.S. PATENT DOCUMENTS

| | | | |
|---|---|---|---|
| 836,303 | 11/1906 | Christensen | 188/67 |
| 1,130,831 | 3/1915 | Madell | 248/410 |
| 1,460,402 | 7/1923 | Benckenstein | 188/67 |
| 1,494,022 | 5/1924 | Roberson | 188/67 |
| 1,543,266 | 6/1925 | Powell | 188/67 |
| 2,051,969 | 8/1936 | Shastock | 287/58 |
| 2,415,663 | 2/1947 | Vitek | 155/886 |
| 2,450,388 | 9/1948 | Trotter | 24/249 |
| 2,496,172 | 1/1950 | Pearce | 24/263 |
| 2,512,150 | 6/1950 | Geren | 121/40 |
| 2,673,590 | 3/1954 | Hamilton | 248/410 |
| 2,923,564 | 2/1960 | Brown | 287/58 |
| 3,374,011 | 3/1968 | Schipper | 280/478 |
| 3,667,573 | 6/1972 | Edwards | 184/1.5 |
| 3,674,116 | 7/1972 | Vogeli | 188/67 |
| 3,741,514 | 6/1973 | Snurr | 248/412 |
| 4,368,586 | 1/1983 | Forzelias | 40/604 |
| 4,508,305 | 4/1985 | Johnson | 208/455 |
| 4,639,979 | 2/1987 | Polson | 24/270 |
| 5,108,066 | 4/1992 | Lundstrom | 248/410 |
| 5,944,146 | 8/1999 | Okpokowuruk | 188/67 |

OTHER PUBLICATIONS

Product Catalog, "Lubrication Equipment & Accessories" —Balcrank Products Inc., One Balcrank Way, Weaverville, NC 28787 (undated), pp. 6–8, 52, 88, cover page and Appendix.

Product Catalog, "Lubrication Equipment" —AROFluid Products Division, The ARO Corporation, One ARO Center, Bryan, OH 45306, 1993, pp. 1, 5, 27–29, and cover page.

Product Catalog 114, Vehicle Services Division, "Vehicle Lubrication Systems", GRACO Inc., P.O. Box 1441, Minneapolis, MN 55440–1441, Apr. 1991, pp. 4, 44 and cover page.

Product Catalog 6000, "KLEENSEAL Portable Lubricating Equipmen:", Lincoln A Pentair Company, One Lincoln Way, St. Louis, MO 63120–1578, Mar. 1993, 3, 16, and cover page.

*Primary Examiner*—Chris Schwartz
*Attorney, Agent, or Firm*—Moore & Van Allen, PLLC; Scott W. Reid

[57] ABSTRACT

A portable vehicle fluid drain device is disclosed. The device includes a vertical drain tube which supports a vehicle fluid drain bowl. The drain tube is manually adjusted to an elevated position, latched in place while the vehicle fluid is drained, and unlatched to descend at a rate less than that of free fall due to the use of a friction brake. The friction force imparted by the brake on the drain tube is adjusted by rotating a wing nut on a carriage bolt to squeeze the inner edges of two wishbone arms against the drain tube. A method of using a vehicle fluid drain device with a brake and a self-latching mechanism is disclosed.

9 Claims, 9 Drawing Sheets

BRAKE MECHANISM FOR CONTROL OF VERTICAL MOTION OF A VERTICALLY ALIGNED ADJUSTABLE DRAIN TUBE

CROSS REFERENCES

This application is a divisional application based on the prior, co-pending application having a Ser. No. 08/749,799 and having a filing date of Nov. 15, 1996.

TECHNICAL FIELD

The present invention relates to mechanical devices used to hold and release vertically aligned vehicle fluid drain tubes. More particularly, the present invention relates to such mechanical devices used to hold and release vehicle fluid drain tubes to allow gravity driven axial movement of the drain tube relative to the mechanism. The drain tube is used to position a drain bowl under a vehicle fluid drain to catch draining fluids. The drain tube provides a fluid channel for draining the contents of the drain bowl to a fluid reservoir.

BACKGROUND ART

Self-latching mechanisms for holding a cylindrical item are well known. This is not surprising since cylindrical shapes are common as either conduits or as structural elements. The cylindrical shape is common due to its ease of manufacture and favorable mechanical properties.

Typically, the self-latching mechanisms are adapted to grab and hold the cylindrical item to prevent gravity induced downward movement of the cylindrical item. The self-latching mechanisms are adapted to allow the user to release the cylindrical item from the self-latching mechanism. Examples of such self-latching mechanisms include U.S. Pat. No. 836,303 granted on Nov. 20, 1906, to Christensen.

The Christensen patent describes an automatic locking collar which may be adjusted either up or down on a cylindrical item. The automatic locking collar will lock automatically in any position against further movement in one direction on the cylindrical item. The Christensen patent also teaches that the collar may be fixed and the cylindrical item may be moved up and down at will through the collar until the collar locks automatically against further movement of the cylindrical item in one direction.

The Christensen locking mechanism is a latch plate with a cut-out slightly larger than the cylindrical item. When the latch plate is released, the latch plate rotates down and the inside edge of the cut-out in the latch plate contacts the cylindrical item. If the collar is fixed, the force of gravity moves the cylindrical item downward and causes the latch plate to rotate around an axis in order to move the contacting edge of the latch plate further toward the center of the cylindrical item. Since the latch plate and the cylindrical item cannot occupy the same space, the downward movement of the cylindrical item continues briefly until the interference between the latch plate and the cylindrical item binds the cylindrical item in place.

In order to free or release the cylindrical item, the latch plate is rotated about its pivot so as to disengage from the cylindrical item. The cylindrical item is released when the latch plate is rotated up and out of the way, in order to free the cylindrical item. The latch plate in many self-latching mechanisms can be rotated out of the way either directly through use of a handle, or indirectly by lifting the cylindrical item up to push the latch plate up. Since such a latch plate is basically a one-way brake, by reason of the servo action of its engagement, a single latch plate will be used to prevent motion in only one direction.

The prior art contains a wide variety of variations on the self-latching mechanism in a variety of applications.

U.S. Pat. No. 1,494,022, issued on May 13, 1924, to Roberson teaches a device for clamping a sucker rod to hold the rod while it is being assembled and inserted into a well. The Roberson device uses a latch plate which is mounted on a hinged plate that straddles the sucker rod as it passes through a cylindrical void slightly larger than the sucker rod. The hinged plate can be rotated so the latch plate does not interfere with the movement of the sucker rod. The hinged plate can also be rotated toward the sucker rod so that contact with the latch plate will bind the sucker rod against the inner wall of the cylindrical void.

U.S. Pat. No. 2,051,969, issued on Aug. 25, 1936, to Shastock is directed to an automatic tube adjuster for telescoping tubes. The Shastock device uses a latch plate with a cut-out through which the cylindrical item passes. The Shastock device uses a spring to automatically move the latch plate into contact with the cylindrical item in lieu of using the weight of the handle to rotate the latch plate into position.

Self-latching mechanisms have been used since at least 1906 in a wide variety of applications, and yet there is a significant limitation in such prior art mechanisms. The limitation is that the prior art mechanisms provide only limited control over the motion of the cylindrical item relative to the self-latching mechanism. The bind and release states of the latch are two polar extremes. Either the cylindrical item is totally bound and cannot move at all, or the cylindrical item is totally released and thus free to fall through the latch mechanism without any impediment to travel.

This shortcoming in prior art devices is not serious if the use is one in which the user is holding the cylindrical item to position it. If the user is holding the cylindrical item, it cannot fall when the latch plate is released. Examples include precise positioning of a dress form to a selected height, or positioning the tilt of a drafting table. Once such adjustments are made, readjustments are not required until there is a new use for the dress form or the drafting table. In such circumstances it is not unduly burdensome to require the user to momentarily support the weight of the cylindrical item and any load attached to the cylindrical item.

Other applications for self-latching mechanisms may require more frequent adjustments. For example, a movie screen support will be set up and put away with each use. In this case the cylindrical object will typically have an extended position and a retracted position. While there may be some range of desired extended positions, the retracted position is fully retracted so the movie screen can be folded and stored. When the desired position of the retracted position is fully retracted, it is foreseeable that the user will release the latch mechanism and allow the cylindrical object to travel all the way back until it hits a mechanical stop that prevents further retraction. Since the latch mechanism lacks an intermediate state between fully latched and totally free, the cylindrical item if not manually restrained, accelerates under the force of gravity until hitting the mechanical stop.

The lack of intermediate states between being fully bound and being free to fall is not a problem if the latch mechanism is used in a device in which the cylindrical item can free fall without causing any harm. When the cylindrical item crashes into the mechanical stop, there will be noise; and the sudden movement and the noise may surprise the user. This situation is usually tolerable for most devices; and in some cases, such situations can be mitigated by adding springs or cushions to the mechanical stop to soften the impact and reduce the noise. However, as described below free fall is not suitable for all applications of latches.

SUMMARY OF THE INVENTION

Thus the prior art has examples of ways to bind and hold a cylindrical item in a fixed position and then fully release the cylindrical item. This is tolerable for some applications, however, some applications that would use a latch mechanism would preferably restrain the rate of descent of the cylindrical item.

One such application is a latch mechanism for a portable oil drain unit. The oil drain unit has a vertical drain tube that is adjusted from a down position to an elevated position just under the undercarriage of a vehicle. The drain tube is adjusted up and down with each use of the portable oil drain unit. The drain tube has a travel range of more than two feet and supports a drain bowl which may contain tools or vehicle parts. A restraint on the rate of acceleration is important for this application because the drain tube and the supported heavy drain bowl can accelerate quite a bit while traveling more than two feet. The adverse consequences of sudden rapid downward movement of heavy items could include substantial noise, risk of contact of items connected to the drain tube item with other non-moving items, including splashing of vehicle fluids onto nearby items, and increased wear through shock, vibration, and distortion of material in the portions of the apparatus that collide as part of the physical stop.

A restraint that cannot be easily adjusted is only a partial cure. Ideally, the amount of resistance or braking force that is exerted can be varied. The ability to vary the braking force would not necessarily require precise control over the amount of braking force that is applied during the descent of the drain tube. Such precision is not required in order to achieve the objectives of reducing the speed of travel to within acceptable limits. The user retains the ability to release the self-latching mechanism and cause the latch plate to engage the side of the drain tube to stop the descent if the speed slowly builds to undesired levels.

However it would be preferable for the braking unit to be adjustable to compensate for: 1) heavier loads, 2) the presence of lubricants which reduce the effectiveness of the braking force or, 3) wear on the brakes or the surface of the drain tube that reduce the effectiveness of the braking force. Additionally, some users may prefer a quick but controlled descent and other users may prefer a much slower descent. If the device is to serve the needs of many users, then it is preferable that users be able to make adjustments to their individual preferences. To be most convenient, the adjustment should be designed so that adjustment can be made by hand without any special tools.

Ideally, the brake for controlling the fall of the drain tube should be designed so that it can be integrated with latch mechanisms to simplify the construction and use of the brake.

In addition to being inexpensive to manufacture, simple to use, the ideal brake should be easy to maintain and should not impede the mobility of the device to which the brake is added. Thus, the ideal brake should not use pneumatic, electronic, or electric forces which limit the mobility of a mobile unit that used the brake.

Therefore it is an object of the present invention to provide a brake to be used to selectively control the rate of acceleration of a vertically aligned stationary drain tube from no acceleration to essentially the acceleration of gravity.

It is another object of the present invention to provide a brake for a vertically aligned drain tube that can be adjusted to compensate for variations in weight of associated load, wear on the brake surface, wear on the surface of the drain tube, and presence of lubricants which reduce friction braking.

It is an additional object of the present invention to provide a brake to control vertical movement of a vertically aligned drain tube which can be adjusted without tools to facilitate adjustments for changes in weight of the load supported by the drain tube, or to accommodate preferences of individual users for the amount of braking to be applied.

It is also an object of the present invention to provide a combination of a latch mechanism and a brake for controlling the vertical movement of a vertically aligned drain tube.

It is yet another object of the present invention to provide a self-latching mechanism with a brake such that the mechanism can be operated with one hand after the brake adjustment is set to the desired setting.

It is yet an additional object of the present invention to provide a self-latching mechanism with a brake which can be operated without the use of electricity, pneumatics, or hydraulics and which is inexpensive to manufacture and maintain.

It yet still another object of the present invention to provide a self-latching mechanism with a brake that can be used repetitively without fatigue to the user from operation of the brake.

It yet still further an object of the present invention to provide a self-latching mechanism in which the brake adjustment does not require the user to squeeze the brake adjustment to maintain the desired braking force.

Other objects and advantages of the present invention will become readily apparent from the description provided.

In accordance with the present invention, a brake for use in restraining the downward acceleration of a vertically aligned drain tube is provided by a motion resisting contact area which is presses against the outer wall of the drain tube to resist downward motion. The resistance to downward motion is varied by a brake adjustment. The preferred embodiment contains a brake and brake adjustment which are integrated into a handle for a self-latching mechanism.

The present invention includes a method of draining a vehicle fluid from a vehicle into a drain bowl mounted on a drain tube which is moveable relative to a fluid chamber. The steps include 1) placing the drain bowl and drain tube under the vehicle fluid drain, 2) raising the drain bowl with the drain tube to an extended position close to and below the vehicle fluid drain, 3) latching the drain tube to hold the drain bowl in position, 4) draining the vehicle fluid from the vehicle into the drain bowl, 5) releasing the drain tube to permit the drain bowl and the drain tube to retract from the extended position, and 6) applying a braking force to the drain tube to limit the acceleration of the drain bowl and drain tube as the drain tube retracts from the extended position. The braking force may be adjusted to provide resistance appropriate to conditions and user preference.

BRIEF DESCRIPTION OF THE DRAWINGS

The present invention will be more fully understood by reference to the following detailed description when considered in conjunction with the following drawings wherein like reference numbers denote the same parts shown throughout the several FIGURES in which.

BEST MODE FOR CARRYING OUT THE INVENTION AND ITS INDUSTRIAL APPLICABILITY

The following detailed description is divided into sections which have section titles to indicate the general nature of the information contained in that section. The sections and their titles are intended solely to assist in the organization and to assist the reader. The use of sections and section titles is not intended to indicate that information suggested by any one title is not contained in any other section.

The environment for use of the present inventions

Figure 1:
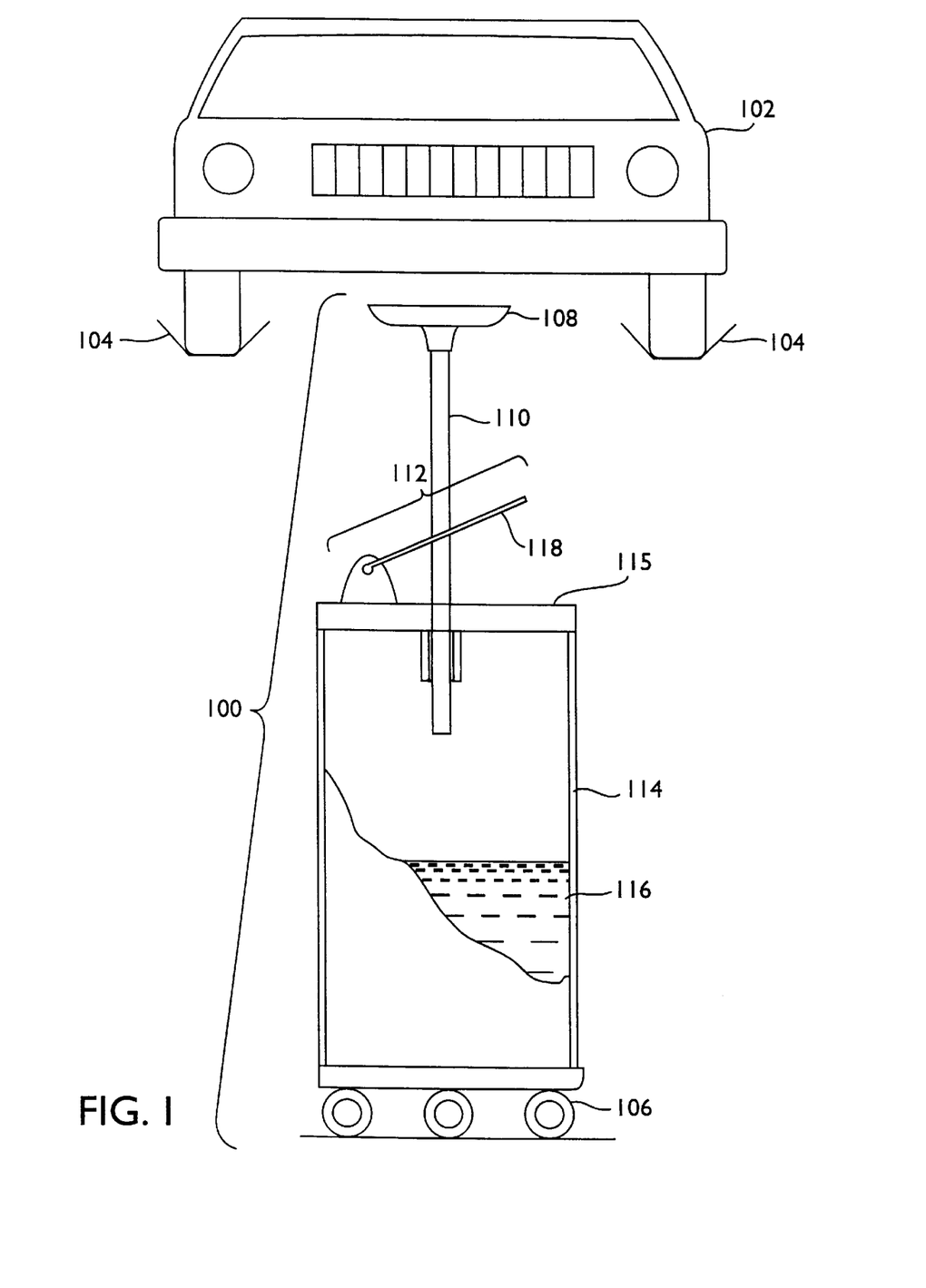
FIG. 1 shows a side view of a portable oil drain with its drain tube extended to position the oil bowl under an elevated vehicle and a partial cutaway of the drain tank to show the reservoir of waste oil contained within.

The environment for use of the present invention is shown in FIG. 1. FIG. 1 shows a side view of a portable oil drain 100 which is used in a service or repair facility for vehicles. In use, the portable oil drain 100 is placed under an automobile 102, which has been elevated and is supported by a lift symbolized by reference number 104. Mobility of the portable oil drain 100 is facilitated by a set of wheels 106 connected to the base of the portable oil drain 100. After positioning the portable oil drain 100 under the automobile 102 the user lifts a drain bowl 108 to a desired height under the oil filter, drain plug, or other vehicle fluid drain port underneath the automobile 102. Once the drain bowl 108 is in position, the user lets go of the drain bowl 108. A drain tube 110 that connects the drain bowl 108 to the rest of the portable oil drain 100 descends very slightly through a self-latching mechanism 112 until the self-latching mechanism 112 acts to stop and hold the drain tube 110 against the force of gravity acting upon the combined weight of the drain tube 110, the drain bowl 108, and the contents of the drain bowl (e.g., one or more used oil filters).

With the drain bowl 108 in the elevated position, the user drains the oil from the automobile 102 into the drain bowl 108, through the drain tube 110, and into a drain tank 114 having a cover 115 and which can contain a reservoir of waste oil 116 left over from several previous oil changes. After the oil has been drained, the user lifts a release handle 118 to release the self-latching mechanism 112.

Before the present invention, the drain tube 110, would free fall upon release, and would stop when the drain bowl 108 struck the rest of the portable oil drain 100 or the drain tube 110 hit a mechanical stop in the drain tank 114. Either way, there would be a sudden impact of the drain bowl 108 and its contents upon reaching bottom. This sudden movement and impact would have the undesirable effects of noise, possible splatter of residual oil from the drain bowl 108, and additional wear and tear upon the portable oil drain 100 from the repeated impacts.

The free fall could be avoided by having the user hold the drain tube 110 or drain bowl 108 to resist the force of gravity. Requiring use of the one free hand of the user is undesirable for several reasons.

First, having the user hold the descending drain bowl 108 would not serve any other useful purpose such as for precise positioning of the drain bowl 108. Using hands to position the drain bowl 108 under the automobile 102 is necessary due to variations of the position of the lift 104 and variations among automobile models of the position of the oil filter or drain plug under the automobile 102. However, the user does not need to position the drain bowl 108 on descent since the optimal position is typically all the way down.

Second, the user may have only one free hand, with a wrench, rag or work order in the other hand. The user is usually able to use two hands while lifting the drain bowl 108 but may be disposed to use only one hand during descent of the drain bowl 108 and use that one hand for the release handle 118. Grabbing the drain bowl 108 with the hand not on the release handle 118, especially if the user waits until after the start of free fall to grab a moving bowl, could be awkward or uncomfortable for the user.

Finally, requiring use of the second hand for slowing or controlling the descent of the drain bowl 108 would usually require that the user put down any tool or other carried object when the user simply wants to drop the drain bowl 108 to the down position and drag the portable oil drain 100 out from under the automobile 102. Therefore, ideally the self-latching mechanism 112 should be operable with one hand.

The situation illustrated in FIG. 1 has several aspects that make the addition of a brake desirable. The weight of the drain bowl 108 which may contain tools or oil filters combined with a free fall of more than two feet generates a substantial amount of kinetic energy to be absorbed by the mechanical stop for the free falling drain tube 108.

The situation illustrated in FIG. 1 also illustrates several of the challenges of adding a brake to a portable oil drain 100. One challenge is the virtual certainty that oil or other lubricants will get onto the outside of the drain tube 110 or onto the brake. Lubricants substantially reduce mechanical friction which then substantially diminishes the braking force from any brake which uses mechanical friction.

The ideal brake would not use electric power for fear of sparks in an area with petroleum products and other possible ignition sources. In order to maintain the portability of the portable oil drain 100, the brake should not require connection to the repair shop's pneumatic air supply, nor to an electric power source or a hydraulic supply. Also, the brake mechanism should not greatly add to the cost, maintenance demands, or complexity of the portable oil drain 100.

The more generalized environment

Note that this description is using a specific fluid, oil, in order to illustrate the environment. Many other fluids are drained underneath raised automobiles including radiator fluid, transmission fluid, brake fluid, power steering fluid, and other hydraulic fluids. The use of the specific fluid, oil, should be seen as illustrative and not limiting the scope of the present invention.

FIG. 1, depicts a typical situation in which a motor vehicle is serviced by lifting the automobile. In lieu of lifting the automobile, the portable drain unit can be located in a grease pit with the vehicle positioned over the opening in the grease pit to give access to the vehicle fluid drains. In some service facilities, the volume of drain fluid collected makes it convenient to add additional tubing to move the drained fluids to a larger stationary reservoir. Some grease pits may use rails rather than wheels to move the oil drain unit. The specifics relating to 1) how the drain bowl 108 is moved laterally, 2) how the vehicle becomes elevated relative to the drain bowl 108, and 3) the location of the drain reservoir are presented in order to illustrate the environment for using the present invention but are not limitations on the scope of the present invention.

The illustrative use of the present invention environment uses an automobile as the vehicle. The term vehicle should be understood to include: automobiles, trucks, trailers for trucks, buses, locomotives, railroad cars, aircraft, and off-road vehicles whether for recreation, construction, or military use. Since the applicable use for the present invention includes draining vehicle fluids such as brake fluid which occur in vehicles such as truck trailers that do not have engines, the present invention is not limited to vehicles having an engine or motor.

A preferred embodiment

Figure 2:
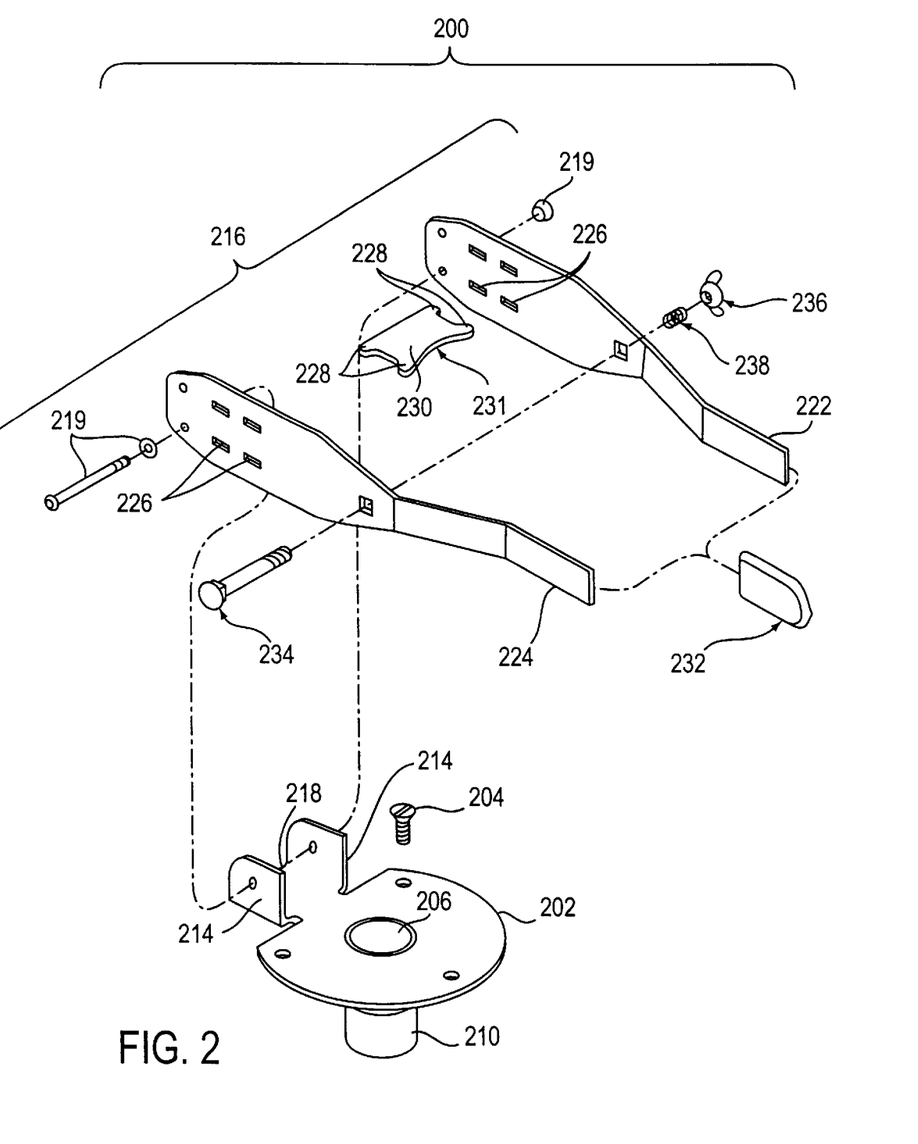
FIG. 2 shows an exploded view of the preferred embodiment of the present invention which combines a brake with a brake adjustment and a self-latching mechanism.
Figure 3:
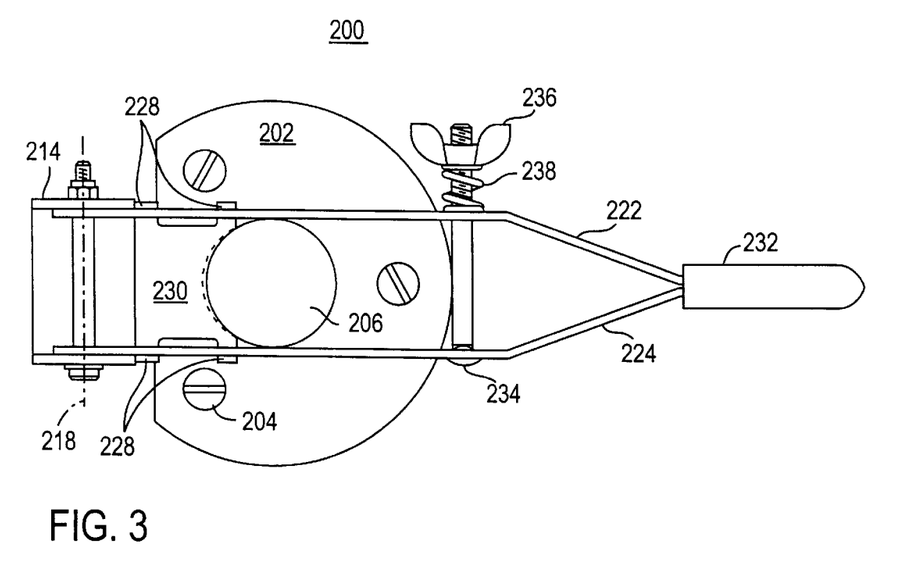
FIG. 3 shows a top down view of the preferred embodiment of a brake with a brake adjustment and a self-latching mechanism when the handle assembly is rotated into a position that places the leading edge of the latch plate over the cylindrical void of the pivot plate.

FIGS. 2 and 3 show a preferred embodiment of the present invention. FIG. 2 is an exploded view of a preferred self-latching mechanism 200 to be used in the environment shown in FIG. 1, in place of reference number 112 which represented a generic self-latching mechanism with a braking mechanism.

The latch mechanism

Self-latching mechanism 200 is comprised of a pivot plate 202 which is attached to the top of a portable oil drain such as that shown as reference number 100 in FIG. 1. The pivot plate 202 is preferably attached to the portable oil drain cover 115 by a number of conventional fasteners such as a bolt 204 (mating nut and lock washer not shown) or alternatively a machine screw. The pivot plate 202 is shaped so that it includes a tube channel which is preferably a cylindrical void 206 which has a diameter that is slightly larger than the diameter of the drain tube 110 (FIG. 1) such that the drain tube 110 can slide axially through the cylindrical void 206 but is substantially constrained from lateral movement within the cylindrical void 206. A protruding tube 210 on the bottom of the pivot plate 202 defines part of the cylindrical void 206.

Although the preferred embodiment is preferably a cylindrical drain tube 110 and a corresponding cylindrical void 206, the present invention is not limited to this combination. A conduit of any reasonable cross section could be used including oblong, rectangular, or some combination of the two. The tube channel need not have the same shape as the drain tube 110. The function of allowing downward axial motion but substantially constraining lateral movement of the drain tube 110, could be achieved through use of a polygonal channel of appropriate dimension. As examples, the channel could be triangular, square, pentagonal, et cetera, or irregularly shaped with guide surfaces sufficient to substantially constrain the drain tube 110 from lateral movement.

The pivot plate 202 has a pivot mount 214 which is adapted to receive a handle assembly 216 so that the handle assembly 216 can pivot around a pivot axis 218. The hardware to mount the handle assembly 216 to the pivot plate 202 is a conventional bolt and nut assembly 219 and need not be explained in any detail.

The handle assembly 216 in the preferred embodiment is made of a set of wishbone arms 222 and 224. In the preferred embodiment these two wishbone arms 222 and 224 are identical, with such additional holes as are needed for the wishbone arms 222 and 224 be interchangeable.

Each of the two wishbone arms 222 and 224 has at least one slot 226 which is sized and spaced on the wishbone arms 222 and 224 to receive a set of tabs 228 on a latch plate 230 having a curved leading edge 231. The two wishbone arms 222 and 224 are joined at the end opposite the bolt and nut assembly 219 by a handle piece 232. Thus the "wishbone" is formed with the proximal end of the wishbone in the handle piece 232 and the two distal ends of the wishbone connected to the bolt and nut assembly 219.

FIG. 3 shows a top down view of a mounted handle assembly when the handle assembly 216 is rotated to be in a horizontal position with respect to the pivot axis 218. The latch plate 230 is sized and positioned in the handle assembly 216 such that the leading edge 231 of the latch plate 230 slightly overlaps the cylindrical void 206. (Note that drain tube 110 is not present in FIG. 3 so the over center interference can be more clearly illustrated.) Therefore, the latch plate 230 is capable of providing an interference fit when the drain tube 110 is in place, so as to stop and hold the drain tube when the drain bowl 108 (FIG. 1) is let go by the user after placing the drain bowl 108 in position for use under the vehicle. In the preferred embodiment, the leading edge 231 of the latch plate 230 is curved away from the drain tube (110 in FIG. 1). Additionally, the latch plate 230 is punched out of metal plate and positioned with the rounded edge from the punch process making contact with the drain tube (110 in FIG. 1).

The latch plate 230 is preferably mounted in a substantially fixed position in the handle assembly 216. A substantially fixed latch plate 230 with the leading edge 231 having a curved and rounded surface provides a smooth engagement with the drain tube 110 when the user rotates the handle assembly 216 to engage or disengage the latch mechanism.

The brake and the brake adjustment

As shown in both FIGS. 2 and 3, a threaded carriage bolt 234 and a wing nut 236 act as a brake adjustment to squeeze the two wishbone arms 222 and 224 together around the drain tube 110. The square shoulder under the head of the standard carriage bolt 234 engages with a square opening in the adjacent wishbone arm 224 to prevent the carriage bolt 234 from rotating.

Other types of threaded elements could be used, preferably with lock washers or some other bias against rotation, in place of the carriage bolt 234. Additionally, the wing nut 236 could be replaced by some alternative rotating element. The alternative rotating element could be a threaded shank which engages a threaded element which has a threaded bore.

Preferably the alternative rotating element is suitable for receiving torque by hand rather than through use of a tool such as a wrench or screwdriver.

Ideally, the rotating element is suitable for receiving torque by hand that is sufficient to alter the brake adjustment from a first extreme position in which the brake provides virtually no impediment to downward movement of the drain tube 110 to a second extreme position in which the brake adjustment causes the brake to impart sufficient frictional resistance to hold a stopped drain tube 110 against the force of gravity acting on the drain tube 110 and the drain bowl 108 with its ordinary contents. Note that the range of adjustment may extend substantially beyond one or both of the "extreme" positions. Additionally a device could be made in accordance with the present invention that does not have a range of adjustment sufficient to reach both or even either "extreme" position.

In the preferred embodiment, a helical spring 238 is placed on the carriage bolt 234 adjacent to the wing nut 236. Rotation of the wing nut 236 alters the amount of compressive force which pushes the two wishbone arms 222 and 224 towards one another. With the drain tube 110 in the cylindrical void 206, the two wishbone arms 222 and 224 will not continue to move appreciably inward with increased tightening rotation of the wing nut 236 once the arms 222 and 224 are both in contact with the outer edges of the drain tube 110. However, the resultant tightening of the contact between the wishbone arms 222 and 224 and the drain tube 110 produces an increasing friction force between the drain tube 110 and the wishbone arms 222 and 224 to resist motion of the drain tube 110. Thus, when the handle assembly 216 is grasped by the user at the handle piece 232 and rotated upward around the pivot axis 218, the leading edge 231 of the latch plate 230 disengages from the surface of the drain tube 110. When the latch plate 230 is disengaged from the drain tube 110, the drain tube 110 is free to fall down through the cylindrical void 206 in the pivot plate 202, impeded only by the friction force between the drain tube 110 and the wishbone arms 222 and 224 that have been tightened around the drain tube 110 by the carriage bolt 234 and wing nut 236.

Therefore, the released drain tube 110 does not experience free fall acceleration; because the contact area between the two wishbone arms 222 and 224 against the drain tube 110 serves as a motion-resisting brake. The released drain tube 110 accelerates downward at an acceleration substantially equal to the local acceleration of gravity minus the force of the brake (and minus the effect of the lesser friction forces such as incidental contact with the cylindrical void 206).

Contingent on the length and arrangement of the drain tube 110 inside the drain tank 114 and the level of the reservoir of waste oil 116 there may be another significant friction force if the drain tube 110 has to travel through the reservoir of waste oil 116. The fluid resistance from the oil in the drain tank 114 adds another level of variability to the system which is another reason that the brake is preferably an adjustable brake.

The amount of friction force exerted by the brake is adjusted by rotation of the wing nut 236. Inclusion of the helical spring 238 serves two purposes. The helical spring 238 makes for a more gradual increase of friction force as the wing nut 236 is rotated in a tightening direction, thereby reducing the responsiveness of the wishbone arms 222 and 224 to the rotation of the wing nut 236, so as to provide finer control of the braking force. Another spring present in the brake adjustment is the elastic deformation of the two wishbone arms 222 and 224. The deformation of the arms acts as a pair of springs to attenuate changes in the applied frictional resistance due to rotation of the rotating element.

The reaction force with which the helical spring 238 resists the wing nut 236 also serves the same function as a lock washer and frictionally prevents undesired rotation of the wing nut 236.

Thus, the present invention provides a simple brake with a brake adjustment that can be adjusted by hand to compensate for wear on the brake surface, wear on the surface of the drain tube 110, the presence of oil on the surface of the drain tube 110, or the added resistance to downward movement of the drain tube 110 from an elevated level of the reservoir of waste oil 116 in the drain tank 114. The brake adjustment is also readily adjusted to compensate for individual preferences on rate of descent acceleration and speed. The brake adjustment is controlled by the rotating element, the wing nut 236, which is advantageously positioned so that it can be adjusted with one hand while the other hand is maintaining the handle assembly 216 in the raised position to keep the latch plate 230 out of the way of the falling drain tube 110.

The ability to adjust the brake control while the drain tube 110 descends is useful in cases in which additional weight in the drain bowl 108 would otherwise cause the drain tube 110 to descend faster than preferred by the user. Making such an adjustment while the drain tube 110 descends would require use of both hands. However, unlike prior art devices, a self-latching mechanism with a brake can be used with one hand to bring the heavy load down without achieving excessive speed.

For example, if a user leaves a heavy tool or an unusual number of oil filters in the drain bowl 108, the drain bowl 108 will descend faster than usual. The frictional resistance, while less than desired for the heavy load will, however, still substantially restrain the acceleration and thus the maximum speed of the heavy load. Since the heavy load is not in free fall, the user will have some time to release or move the handle assembly 216 to stop the acceleration. Therefore, a series of accelerations held to a manageable level the braking force and terminated one or more times by movement of the handle assembly 216 to stop the drain tube 110 before it reaches bottom, can be used to bring even an unusually heavy load down at an acceptable maximum speed while using only one hand.

In the event that the drain bowl 108 and the bowl contents are too light to cause the drain tube 110 to descend against braking force that is set for a much heavier load, the user can either readjust the braking force or pull down on the drain bowl 108 with a free hand.

Other embodiments

Figure 4:
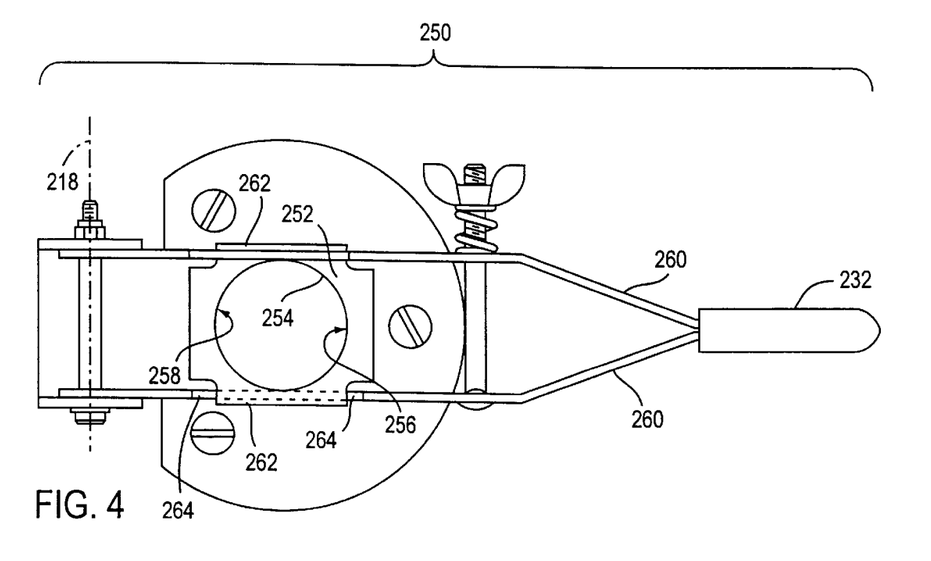
FIG. 4 shows a top down view of an alternate embodiment of the present invention which uses a floating latch plate with a circular cut-out and includes a partial cutaway of one of the wishbone arms to reveal the difference in size between the latch tab and the arm slot.

After disclosure of this preferred embodiment, one skilled in the art could make a number of substitutions and variations in keeping with the teachings of the present invention to add a friction brake to a self-latching mechanism. FIG. 4 shows one such variation.

FIG. 4 shows a top down view of an alternate embodiment of the self-latching mechanism 250. To highlight the differences with the preferred embodiment, only the parts which are necessary to explain the differences are identified in FIG. 4. To further emphasize the differences between the two embodiments, elements of the alternate embodiment which are different from the preferred embodiment are given new reference numbers. For example, FIG. 4 contains reference number 250 instead of reference number 200 for the self-latching mechanism.

The principal difference in FIG. 4 is the use of a floating latch plate 252 with a circular cut-out 254. This floating latch plate 252 is used in place of latch plate 230 (FIG. 2). The drain tube 110 (FIG. 1) is placed through the cut-out 254 and into the cylindrical void 206 (FIG. 2). The drain tube 110 can pass through the cut-out 254 when the self-latching mechanism 250 is rotated up toward the horizontal orientation of the floating latch plate 252 so that horizontal distance between a distal edge 256 of the cut-out 254 and a proximal edge 258 of the cut-out 254 exceeds the outer diameter of the drain tube 110. Rotation of the self-latching mechanism 250 downward from the horizontal orientation of the floating latch plate 252 reduces the horizontal distance between the two edges 256 and 258. The rotation downward continues until the two edges 256 and 258 pinch the drain tube 110, to stop and hold the drain tube 110.

The maximum clearance for the vertical drain tube 110 to pass through a given cut-out is present when the cut-out walls are aligned parallel with the drain tube 110 walls. Thus, if the cut-out 254 is aligned normal to the surface of the floating latch plate 252, the horizontal distance between the two edges 256 and 258 will be greatest when the floating latch plate 252 is horizontal. Thus, the handle piece 232 must have room to fall below horizontal so that the floating latch plate 252 can rotate to pinch and hold the wall of the drain tube 110.

Figure 5:
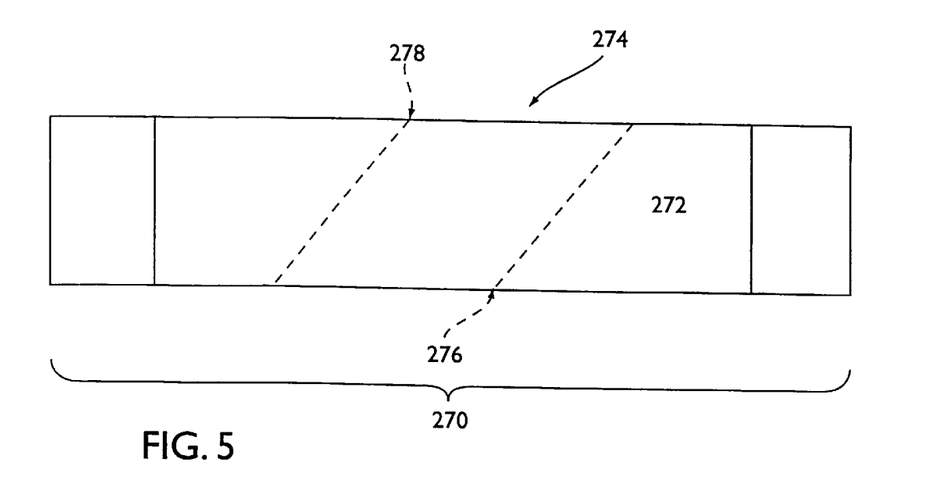
FIG. 5 shows a side view of a floating latch plate with a circular cut-out that is aligned at an oblique angle with respect to the surface of the top surface of the floating latch plate.

The use of a cut-out aligned at an oblique angle relative to the surface of the floating latch plate 252 results in maximum clearance when the floating latch plate 252 is rotated to the angle that vertically aligns the cut-out wall. This is illustrated in FIG. 5 where a side view of alternative floating latch plate 270 is shown with a floating latch plate tab 272 in the foreground. The position of an oblique cut-out 274 is indicated by the dashed lines. To emphasize the effect of the oblique angle, the angle has been illustrated at a exaggerated deviation from normal to the floating latch plate 270. Additionally, the thickness of the floating latch plate 270 has been exaggerated to emphasize the effect of the oblique angle for the cut-out 274. Notice that the clearance space for a drain tube 110 (FIG. 1) is limited by the horizontal distance between a leading distal edge 276 of the oblique cut-out 274 and a leading proximal edge 278 of the oblique cut-out 274. Thus, the use of a cut-out aligned at an oblique angle can be used to alter the angles at which the floating latch plate pinches and releases the drain tube.

The floating latch plate 252 or 270 with a cut-out (either normal or oblique) can be used with the present invention but is not the preferred mode. The reason that the latch plate 230 is preferred over floating latch plates 252 or 270 is the simple rotational movement of the latch plate 230 as constrained from translational movement by the constraint of the set of tabs within the slots 226. The constraint provides a smoother operation of the latch mechanism than is found in the alternate embodiment. In the alternative embodiment shown in FIG. 4 the movement of the floating latch plate 252 is a combination of rotational and translational movement.

FIG. 4 has a partial cutaway of the alternative wishbone arms 260 to show the position of a set of tabs 262 for alternative floating latch plate 252 resting on the bottom edge of one of the two slots 264. (The other slot cannot be seen in this view but is located in the corresponding position in the other wishbone arm.) The slots 264 are sized so that the tabs 262 do not contact the end of the slots 264 to constrain the movement of the floating latch plate 252 from movement along the length of the slots 264 within the wishbone arms 260. The slots 264 and set of tabs 262 are sized to allow the floating latch plate 252 to move until rotation of the floating latch plate 252 pinches the drain tube 110 (FIG. 1).

The movement of the floating latch plate 252 in the wishbone arms 260 accentuates the bipolar bind and release behavior of the latching mechanism. At least some users prefer the roll-on/roll-off sensation provided by the preferred self-latching mechanism 200 over the biting sensation of the alternate self-latching mechanism 250.

Figure 6:
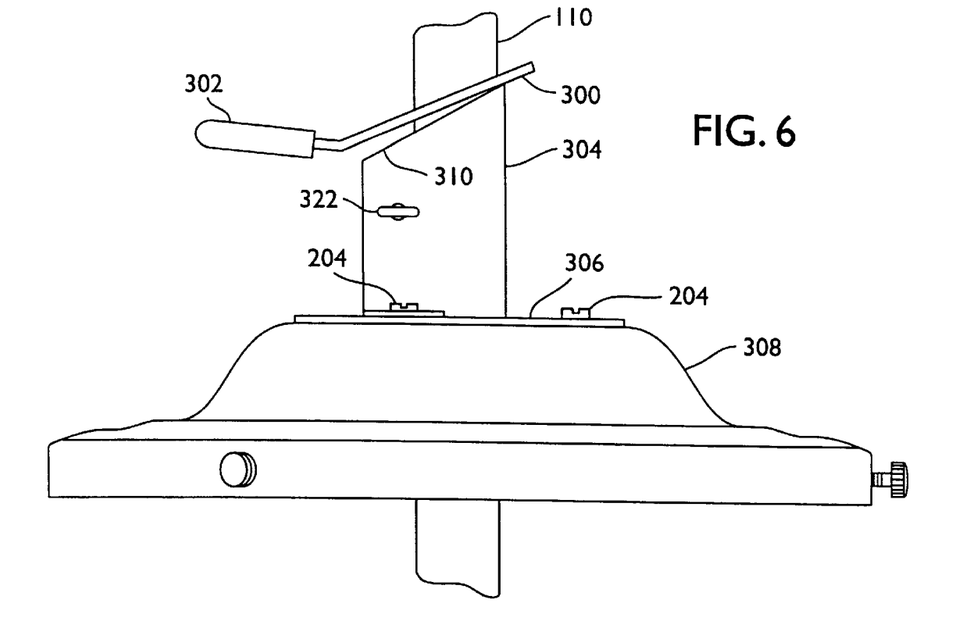
FIG. 6 shows a side view of another alternate embodiment of the present invention which uses a floating latch plate that is not part of a pivotally mounted handle assembly and uses a brake mechanism which in not part of a pivotally mounted handle assembly (best shown in FIG. 8)
Figure 7:
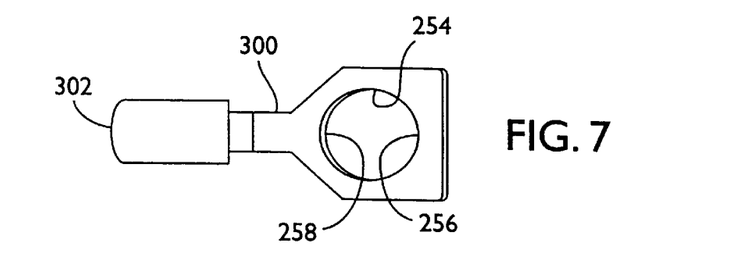
FIG. 7 shows a top view of the floating latch plate from FIG. 6.
Figure 8:
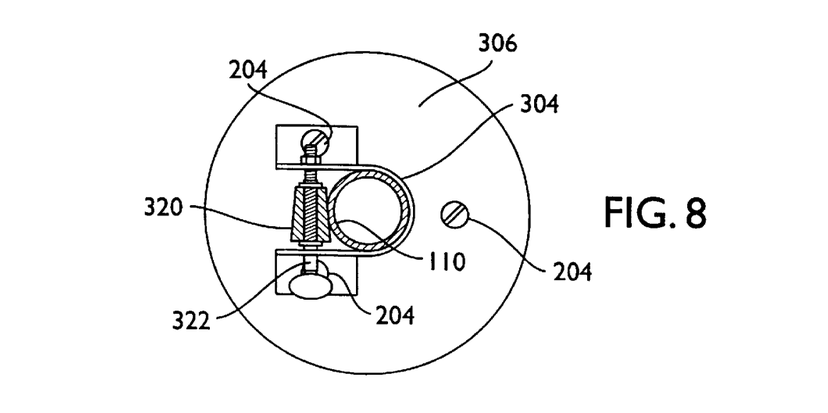
FIG. 8 shows a top view of the embodiment shown in FIG. 6 but with the floating latch plate removed to afford an unobstructed view of the brake mechanism thumbscrew and conical sleeve which serves as a wedge shaped object.

FIGS. 6,7, and 8 illustrate another embodiment of the present invention. A floating latch plate 300 is shown in FIG. 6 and FIG. 7 but omitted from FIG. 8 to provide a view of other elements. The floating latch plate 300 has the cut-out 254, distal edge 256, and proximal edge 258 described in the text associated with FIGS. 4 and 5. The floating latch plate 300 is not connected to a pivot axis (compare 218 in FIG. 4) but operates to release the drain tube 110 when the user raises floating latch plate handle 302 to cause a combination of rotational movement and translational movement of the floating latch plate 300 to align the cut-out 254 with the drain tube 110 to allow the drain tube 110 to drop. The rotational movement of the floating latch plate 300 will arise from the pivoting of the floating latch plate 300 relative to a floating latch plate support 304. The floating latch plate support 304 is connected to a pivot plate 306 using some of a set of fasteners 204 used to connect the pivot plate 306 to a drain tank cover 308. (Shown here in more detail than cover 115 in FIG. 1.)

Release of the floating latch plate handle 302 causes the floating latch plate 300 to fall and grab the drain tube 110 with a pinching engagement as previously discussed. Note that the slope of a top surface 310 of the floating latch plate support 304 must be designed to allow the floating latch plate 300 to rotate into pinching engagement with the drain tube 110. It is better to provide the top surface 310 with enough slope so that the floating latch plate 300 cannot rotate down to contact the entire top surface 310, (as shown in FIG. 6) than to provide an inadequate slope and stop rotation of the floating latch plate 300 before pinching engagement stops the drain tube 110.

FIG. 8 presents a top view of this embodiment with the floating latch plate 300 removed. In addition to previously identified elements, FIG. 8 shows the elements in the brake mechanism for the present embodiment. The present embodiment provides a motion resisting contact area to resist downward motion of the drain tube 10 by positioning a wedge shaped object 320 into contact with the drain tube 110. The drain tube 110 is constrained from lateral movement by the cylindrical void (shown in FIG. 2 element 206)

and the inside wall of the floating latch plate support 304 that is positioned in contact with the drain tube 110 over about 180 degrees of its circumference. The amount of frictional resistance to downward motion is altered by rotation of a thumbscrew 322.

Figure 9:
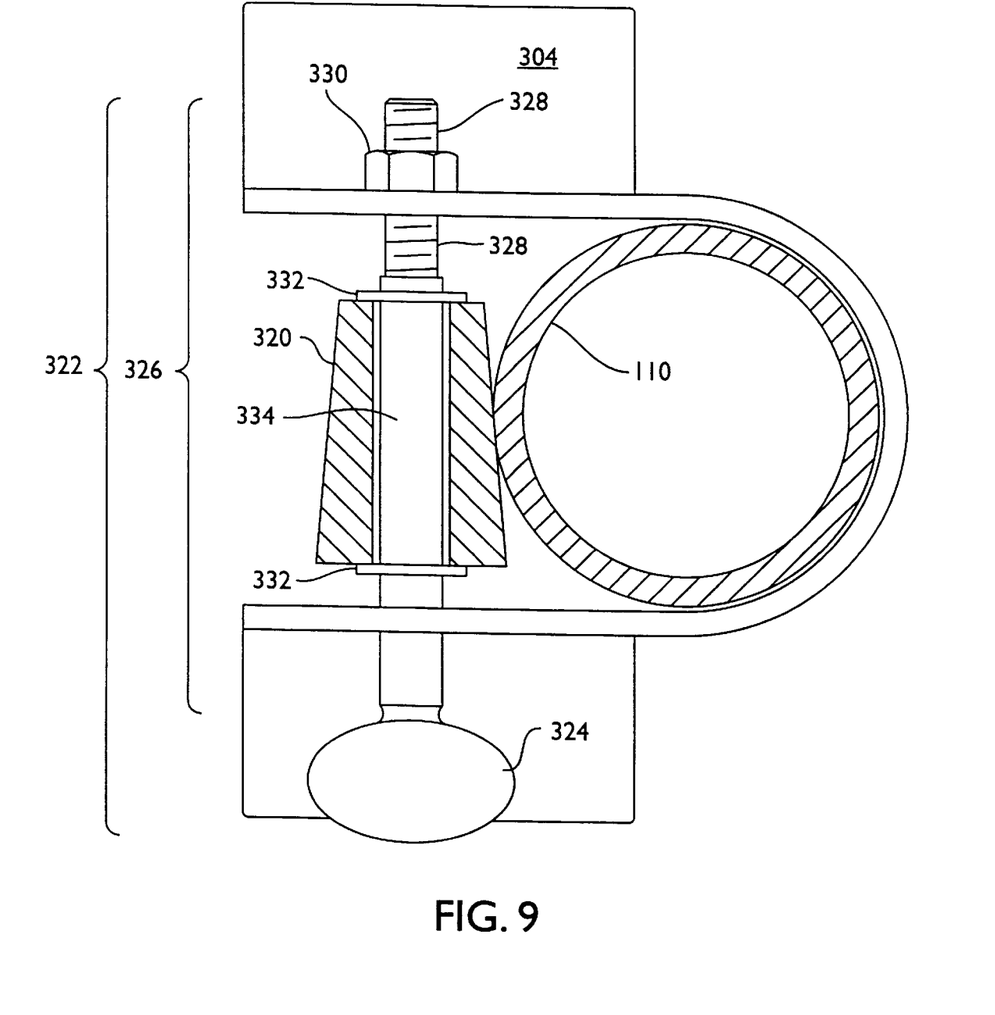
FIG. 9 shows an enlarged top view of the thumbscrew, wedge shaped object, and related elements.

Thumbscrew 322 is shown in greater detail in FIG. 9 in which the fasteners 204 have been omitted to promote clarity. The thumbscrew 322 is comprised of a thumbpiece 324, and a shank 326. The majority of the shank 326 is smooth, but the shank 326 has a threaded portion 328 at the end distal to the thumbpiece 324. A threaded element 330 having a threaded bore (not shown) is associated with one side of the floating latch plate support 304. The threaded element 330 shown in this embodiment is a nut that has been tack welded adjacent to and aligned with an opening in the floating latch plate support 304. The threaded element could be a threaded bore in floating latch plate support 304, but that would require a thicker metal piece for fabrication of the floating latch plate support 304.

The wedge shaped object 320 is shown here is a sleeve for the shank 326 in the shape of truncated cone. Other shapes could be used as well, including an elongated polyhedron that approximates a truncated cone or even an elongated polyhedron that has several parallel faces and one non-parallel face that extends out toward the drain tube 110.

The wedge shaped object 320 is held in place on the shank 326 by a pair of axial stops 332. The axial stops 332 shown here are spring washers which prevent axial movement of the wedge shaped object 320 relative to the shank 326. Another common axial stop (not shown) is known as an "E-clip". One skilled in the art of machine design could substitute other axial stops including an application of glue or a bead of welding. Note that the shank 326 can rotate within a bore shaped void 334 (shown here via a partial cutaway) in the wedge shaped object 320, but rotation of the thumbscrew 322 will cause axial motion of the wedge shaped object 320 such that the wedge shape presses less or more against the drain tube 110 so as to alter the frictional force on the drain tube 110 and the surface of the support 304 that is wrapped 180° around the drain tube 110.

Note that although the brake mechanism of this embodiment is illustrated in combination with a particular floating latch plate 300, the brake mechanism operates independently of the latch mechanism. This brake mechanism could be adapted for use with any latch mechanism including latch mechanisms that are part of a pivotally mounted handle assembly.

Figure 10:
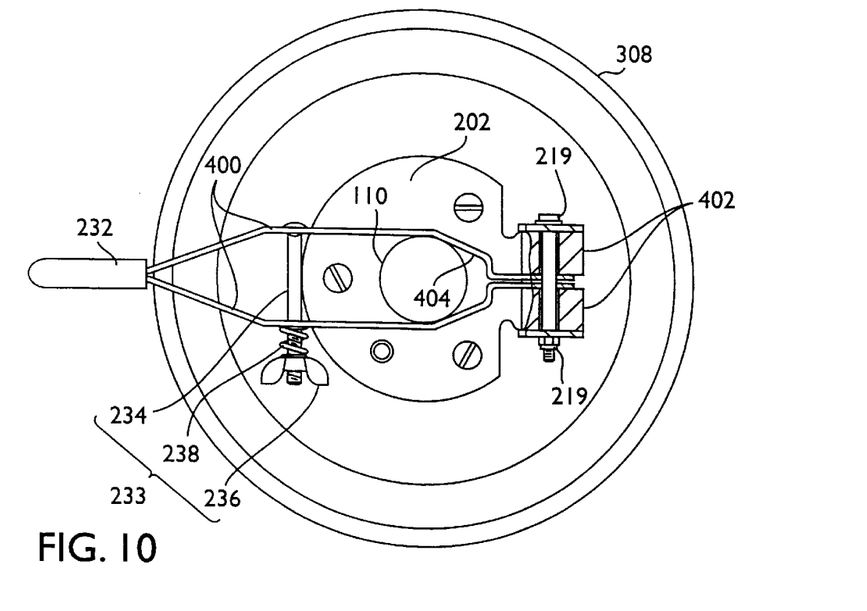
FIG. 10 shows a top view of another embodiment of the present invention in the latched position which uses a wedge shaped void on the pivot side of the drain tube to bind the drain tube and a threaded assembly to squeeze the handle arms to serve as motion resisting surfaces.
Figure 11:
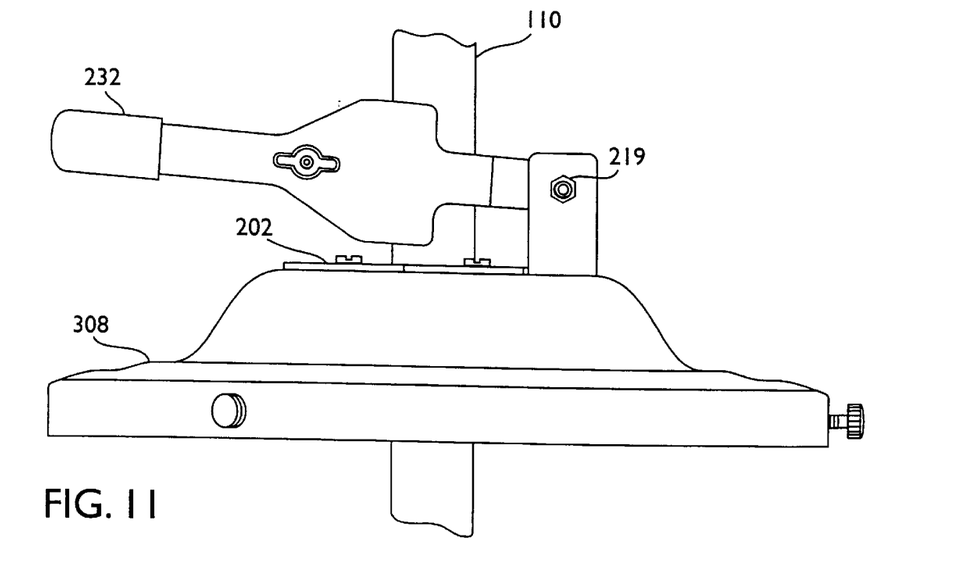
FIG. 11 shows a side view of the embodiment shown in FIG. 10.
Figure 12:
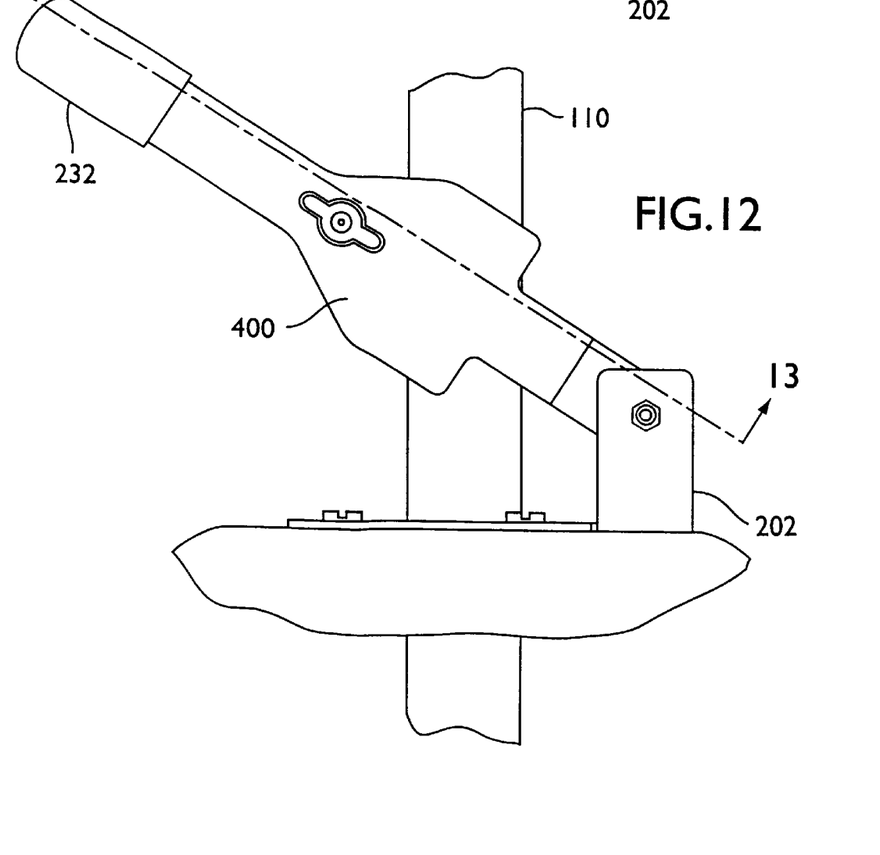
FIG. 12 shows a side view of the embodiment shown in FIG. 10 but with the handle arms in the unlatched position.
Figure 13:
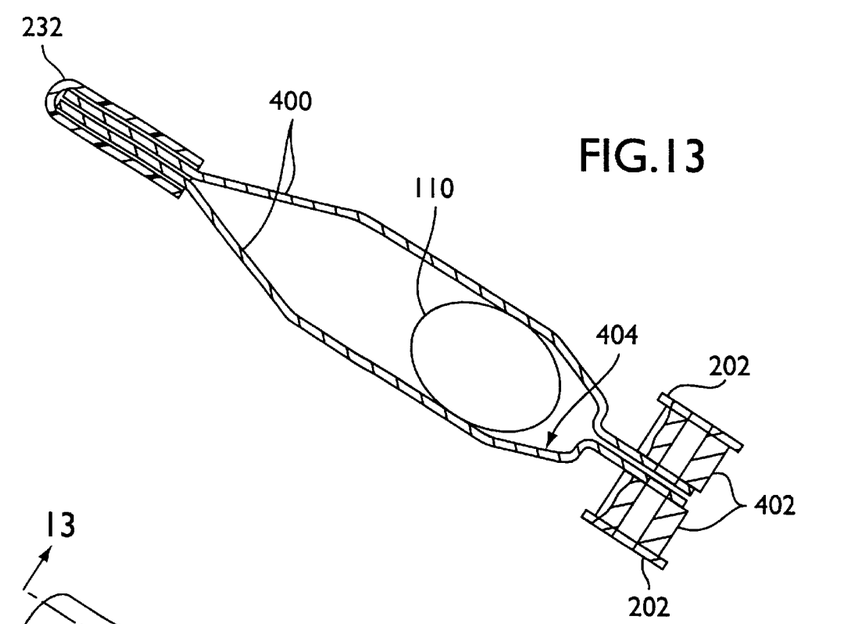
FIG. 13 shows a sectional view of FIG. 12 to highlight the position of the unlatched drain tube relative to the wedge shaped void.

FIGS. 10, 11, 12, and 13 show another embodiment of the present invention. FIGS. 10 and 11 show the embodiment in the latched position. FIGS. 12 and 13 show the embodiment in the unlatched position. The drain tube 110 also passes through the cylindrical void (FIG. 2 element 206) in the pivot plate 202 which is attached to the drain tank cover 308. The drain tube 110 passes through a handle assembly comprised of a pair of handle arms 400 with the distal ends of both handle arms pivotally mounted on a bolt and nut assembly 219 passing through ears in the pivot plate 202 (See FIG. 2 and related text for more detail on bolt and nut assembly 219.) The two distal ends of the handle arms 400 are kept substantially adjacent to one another by a pair of spacers 402 that are mounted on the bolt and nut assembly 219. The proximal ends of both handle arms 400 are joined by a handle piece 232.

Note that the shape of the handle arms 400 forms a wedge shaped void 404. When the handle assembly is rotated down to horizontal, the portion of the handle arms 400 containing the wedge shaped void 404 moves horizontally toward the drain tube 110 and engages the drain tube 110 to wedge the drain tube 110 between the two handle arms 400. The spacers 402 resist the tendency of the distal ends of the handle arms 400 to expand the wedge shaped void 404.

FIG. 12 shows the handle assembly raised to the unlatched position. As best shown in FIG. 13, rotation of the handle arms 400 to the unlatched position causing the wedge shaped void 404 to move away from the drain tube 110 (which appears elliptical in FIG. 13 because the view is taken at an angle relative to the circular cross section of the drain tube 110). Once free of the binding effect of the portion of the handle arms 400 that form the wedge shaped void 404, the drain tube 110 faces frictional resistance to downward motion from a motion resisting contact area in which the drain tube 110 contacts the inner walls of the handle arms 400. The amount of frictional resistance is regulated by a threaded assembly 233 made up of the carriage bolt 234, wing nut 236, and helical spring 238.

Placement of the threaded assembly 233 toward the handle piece 232 rather than closer to the drain tube 110 provides a greater moment arm for the threaded assembly 233 which reduces the effect of rotating the wing nut 236 by a small amount. This reduced response to a given amount of rotation provides an increase in the amount of control over the resistance to motion. A longer handle assembly could be used to give an even longer moment arm. Also, the inevitable flexibility of the handle arms 400 further reduces the frictional response to a given rotation of the wing nut 236.

Figure 14:
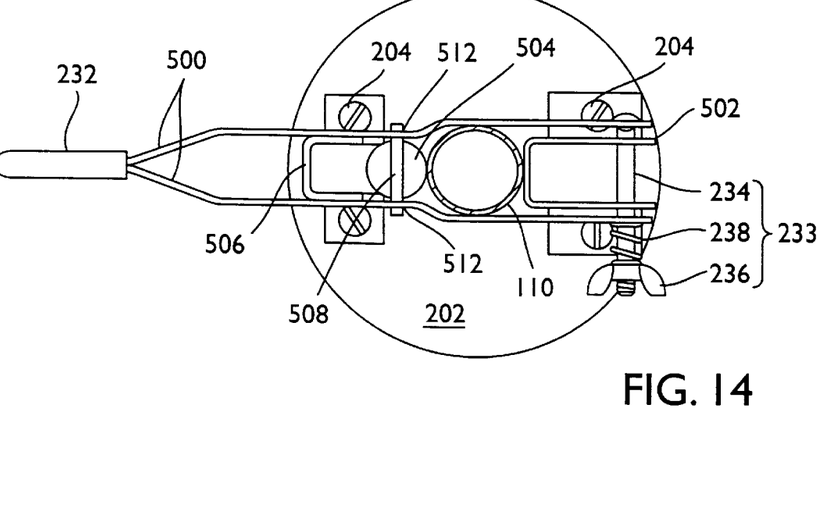
FIG. 14 shows a top view of another embodiment of the present invention that uses a ball constrained to travel in a channel as part of the latch mechanism combined with a braking mechanism controlled by a threaded assembly which also serves as part of the pivotal mounting of the handle arms.
Figure 15:
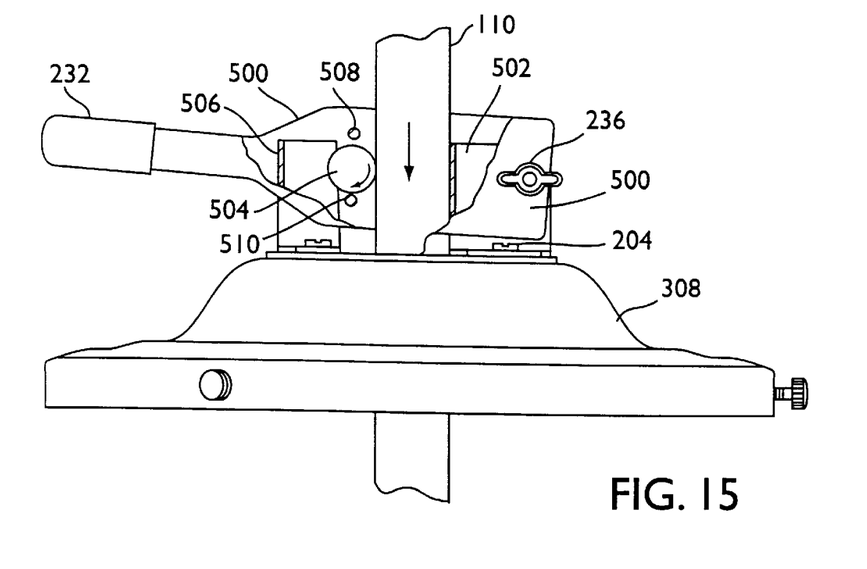
FIG. 15 shows a side view of the embodiment shown in FIG. 14 but with partial cut away to show the position of the ball relative to the fixed element with its concave channel, the pin serving as the upper restraint, the second pin serving as the lower restraint, and the interaction between the drain tube and the ball.

Yet another embodiment of the present invention is illustrated in FIGS. 14 and 15. The braking mechanism is similar to that shown in some of the preceding embodiments. Control of the frictional force is by rotation of rotating element (the wing nut 236) that is threadedly mounted on the threaded element (the carriage bolt 234). Rotation of the wing nut 236 compresses a pair of handle arms 500 to squeeze the drain tube 110 to resist downward motion of the drain tube 110. The optional helical spring 238 attenuates the change in frictional resistance for a given amount of rotation of the wing nut 236. Note that this embodiment places the threaded assembly 233 on the opposite side of the drain tube 110 from the handle piece 232.

In this embodiment, the threaded assembly passes through the pair of handle arms 500 and through a pivot mount 502. Note that the pivot mount 502 does not abut the pair of handle arms 500, thus allowing room for compression of the gap between the pair of handle arms 500 and the pivot mount 502 at the threaded assembly 233. Pivot mount 502 abuts the drain tube 110 to add an additional restraint against lateral movement of the drain tube 110.

The latch mechanism of this embodiment relies on the force imparted by a ball 504 that applies pressure against the drain tube 110 to press the drain tube 110 against the cylindrical void (FIG. 2, element 206) and the fixed wall of the pivot mount 502.

The movement of the ball 504 is substantially constrained by a fixed element 506 having a concave channel. As shown best in FIG. 14, the fixed element 506 has a U-shaped bracket which is open to the ball 504. The fixed element 506, like the pivot mount 502, is mounted by fasteners 204 to the pivot plate 202 and the drain tank cover 308 (shown in FIG. 15). As best seen in the partial cutaway in FIG. 15, the fixed element 506 has a sloped face so that the bottom of the fixed element 506 is closer to the drain tube 110 than is the top of the fixed element 506.

The ball 504 is further constrained by an upper restraining element 508 and a lower restraining element 510. In the present embodiment both are pins which pass through holes in the pair of handle arms 500 and are either locked in place by spring clips 512, tack welded to the pair of handle arms 500, or affixed to the handle arms 500 in some other manner.

The operation of the latch is as follows. Lifting the handle piece 232 causes the pair of handle arms 500 to rotate up around the threaded assembly 233 which passes through the pivot mount 502. The lower restraining element 510 moves with the pair of handle arms 500 and pushes up on the ball 504. As the ball 504 moves up, there is more clearance for the ball 504 between the fixed element 506 and the drain tube 110. After the ball 504 moves sufficiently, the drain tube 110 is released to fall downward, impeded only by the frictional resistance imparted by the action of the carriage bolt 234 to bias the inner walls of the pair of handle arms 500 against the drain tube 110. The upper restraint 508 serves to keep the ball 504 from coming out of the constrained area.

Release of the handle piece 232 causes the pair of handle arms 500 to rotate down under the force of gravity. Gravity and pressure from the upper restraint 508 push the ball downward along the channel defined by the fixed element 506. The channel defined by the fixed element 506 leads the ball 504 into contact with the drain tube 110. The downward movement of the drain tube 110 causes the ball 504 to move further down into the decreasing gap between the fixed element 506 and the drain tube 110, until the drain tube 110 is bound between the ball 504 and the combination of the pivot mount 502 and the walls of the cylindrical void (FIG. 2, element 206).

The conception and the specific embodiments disclosed above may be readily utilized as a basis for modifying other structures for carrying out the purposes of the present invention. Such equivalent constructions do not depart from the spirit and scope of the invention, as set forth in the appended claims.

I claim:

1. A braking system for a vehicle fluid drain unit, the vehicle fluid drain unit comprising a vehicle fluid drain bowl, a plate with a channel wall defining a tube channel, and a drain tube supporting the vehicle fluid drain bowl, the drain tube aligned substantially vertically and passing substantially vertically through the tube channel defined by the channel wall, the channel wall substantially constraining the lateral movement of the drain tube, the brake system comprising:

a latch mechanism to hold the drain tube against the force of gravity, the latch mechanism comprising:
a ball;
a first fixed element fixedly connected to the plate and having a sloped face adapted to guide the ball downward and toward the drain tube when the ball is suitably constrained;
a means for lifting the ball from:
a first position where the ball exerts sufficient force upon the drain tube to hold the drain tube against the force of gravity to
a second position where the ball presents no substantial impediment to motion of the drain tube downward;
a motion resisting contact area for contact with the drain tube to impart frictional resistance to the downward movement of the drain tube; and
a brake adjustment for adjusting the frictional resistance applied by the motion resisting contact area to the drain tube.

2. The braking system of claim 1 wherein the first fixed element further comprises a concave channel in the sloped face to limit the lateral movement of the ball as it moves downward and toward the drain tube.

3. The braking system of claim 2 wherein the means for lifting the ball comprises:
a pivot mount;
a handle assembly pivotably mounted on the pivot mount; the handle assembly comprising
a first handle arm having a proximal end and a distal end, the distal end pivotally mounted to the pivot mount;
a second handle arm having a proximal end and a distal end, the distal end pivotally mounted to the pivot mount;
a handle piece connecting the proximal end of the first handle arm and the proximal end of the second handle arm;
an upper restraining element substantially fixed between the first handle arm and the second handle arm;
a lower restraining element substantially fixed between the first handle arm and the second handle arm, the position of the upper and lower restraining elements being adapted to push the ball along a path substantially constrained by the concave channel and the drain tube from the first position to the second position.

4. The braking system of claim 3 wherein the latch mechanism is a self-latching mechanism adapted to engage when the drain tube moves downward.

5. The braking system of claim 3 wherein the upper restraining element and the lower restraining element are pins.

6. The braking system of claim 3 wherein the latch mechanism further comprises a second fixed element fixedly mounted to the plate and substantially adjacent to the drain tube to exert binding force against the drain tube when the handle assembly is rotated to the second position.

7. The braking system of claim 3 wherein the motion resisting contact area is associated with one of the two handle arms.

8. The braking system of claim 7 wherein the brake adjustment comprises:
a threaded assembly having a threaded element and a rotating element threadedly engaged with the threaded element; and
the brake adjustment being adapted to alter the frictional resistance by a rotation of the rotating element with respect to the threaded element.

9. The braking system of claim 7 wherein the threaded assembly is used to pivotally mount the handle assembly.

* * * * *